(12) United States Patent
Reinhold et al.

(10) Patent No.: US 7,567,342 B2
(45) Date of Patent: Jul. 28, 2009

(54) ARRANGEMENT FOR THE OPTOELECTRONIC RECORDING OF LARGE-AREA FINGERPRINTS

(75) Inventors: Bernd Reinhold, Jena (DE); Uwe Richter, Jena (DE); Juergen Hillmann, Jena (DE)

(73) Assignee: Cross Match Technologies GmbH, Jena (DE)

( * ) Notice: Subject to any disclaimer, the term of this patent is extended or adjusted under 35 U.S.C. 154(b) by 763 days.

(21) Appl. No.: 11/341,081

(22) Filed: Jan. 27, 2006

(65) Prior Publication Data
US 2006/0169159 A1 Aug. 3, 2006

(30) Foreign Application Priority Data
Jan. 28, 2005 (DE) .............. 10 2005 004 640

(51) Int. Cl.
*G06K 9/74* (2006.01)
(52) U.S. Cl. .............. 356/71; 356/445; 382/115; 382/124; 382/127
(58) Field of Classification Search .............. None
See application file for complete search history.

(56) References Cited

U.S. PATENT DOCUMENTS

| | | | | |
|---|---|---|---|---|
| 4,032,889 | A * | 6/1977 | Nassimbene | 382/115 |
| 5,526,436 | A * | 6/1996 | Sekiya | 356/71 |
| 5,528,355 | A | 6/1996 | Maase et al. | |
| 6,038,332 | A | 3/2000 | Fishbine et al. | |
| 6,175,407 | B1 | 1/2001 | Sartor | |
| 6,324,310 | B1 * | 11/2001 | Brownlee | 382/312 |
| 7,227,978 | B2 * | 6/2007 | Komatsuzaki et al. | 382/124 |
| 7,480,397 | B2 * | 1/2009 | Ide | 382/124 |
| 2002/0090147 | A1 | 7/2002 | Scott et al. | |
| 2004/0109245 | A1 | 6/2004 | McClurg et al. | |
| 2004/0146188 | A1 * | 7/2004 | Carver et al. | 382/127 |
| 2006/0119918 | A1 * | 6/2006 | Saito | 359/204 |

FOREIGN PATENT DOCUMENTS

DE 44 21 242 12/1994

* cited by examiner

*Primary Examiner*—Gregory J Toatley, Jr.
*Assistant Examiner*—Juan D Valentin
(74) *Attorney, Agent, or Firm*—Reed Smith LLP (57) ABSTRACT

The invention is directed to an arrangement for the optoelectronic recording of large-area fingerprints, particularly for acquiring prints of the entire palm of the hand. The object of the invention is to find a novel possibility for recording the papillary ridge pattern of a hand which permits a complete optoelectronic image recording with one-time placement of large-area concave skin parts without the use of optical beam paths that are subject to contamination and without having to accept a loss of resolution. This object is met, according to the invention, in that the support body for supporting the skin parts has the basic shape of a cylinder providing a portion of the outer surface with a sufficient radian measure and radius as support surface, the end faces of the support body are each provided with a conical recess which is arranged coaxially around the cylinder axis in order to couple in an illumination beam path and an imaging beam path through the surface lines of the conical recesses, and the imaging beam path and a linearly extending image sensor are rotatable synchronously around the cylinder axis in order to record successive line-shaped strips of the frustrated total reflection at the illuminated outer surface of the support body with the supported skin part.

22 Claims, 8 Drawing Sheets

ARRANGEMENT FOR THE OPTOELECTRONIC RECORDING OF LARGE-AREA FINGERPRINTS

CROSS REFERENCE TO RELATED APPLICATIONS

This application claims priority of German Application No. 10 2005 004 640.1, filed Jan. 28, 2005, the complete disclosure of which is hereby incorporated by reference.

BACKGROUND OF THE INVENTION a) Field of the Invention

The invention is directed to an arrangement for the optoelectronic recording of large-area fingerprints, particularly for acquiring prints of the entire palm of the hand. It is used for the recording of personal features for identification services and forensic identification.

b) Description of the Related Art

In law enforcement identification services, fingerprints and handprints of individuals are taken in order to be able to establish their identity. For more than one hundred years, the recording of the patterns of the papillary ridges on the finger and hand has conventionally been carried out by inking the surfaces of the finger or hand and subsequently printing them on paper. With the availability of high-performance electronic sensors and computers, arrangements have become known which are used for direct electronic acquisition of the patterns without the intermediary of ink, paper and scanning of the print image. In this way, the electronic acquisition can be carried out substantially faster and, above all, with higher quality.

While there have been many diverse publications concerned with the electronic acquisition of prints of individual fingers (more exactly, the upper two joints of the finger), only few solutions are known for acquiring the palm of the hand. These solutions are directed to arrangements which are either limited in format and allow only part of the palm to be acquired in one process or which can acquire the entire full-size hand but do not reliably achieve the quality necessary for applications of this kind.

The pre-published application US 2002/0090147 A1 describes an arrangement for optically recording the patterns of the palm of a hand in which the pattern of the papillary ridges lying on a plane recording surface of a prism is rendered visible as an image by means of frustrated total internal reflection (FTIR). For this purpose, the prism which is made of an optical solid material (e.g., glass) is supported in a stationary manner and incorporated in an optical imaging beam path for imaging the hand supporting surface on an image sensor. A mirror which can be tilted in two axes in a controlled manner is located in the beam path to increase the resolution of the two-dimensional image recording sensor through a special method with multiple recording of the images and subsequent combination of the image data.

In this arrangement, it works out disadvantageously that the palm of the hand is more or less curved inwardly and for this reason does not make direct contact in its entirety with the recording surface so that relatively large areas (usually in the center of the palm) are not imaged (i.e., appear white or empty). A practical remedy can be to apply pressure to the top of the hand resting upon the recording surface. However, given the concave surface of the hand, this improves the imaging only to a certain extent because the increased contact pressure on the parts of the hand that already had good contact before presses the papillary ridges together and the pressed areas in the resulting image appear very dark with poor contrast and are therefore more difficult to evaluate.

U.S. Pat. No. 6,038,332 describes an arrangement for the optical recording of patterns on the palm of a hand. The curved surface of a transparent half-tube (a glass tube that is split along its length) serves as a stationary support for the palm. In the interior, it is ensured by means of a light rod which extends linearly along the curved surface and which illuminates the curved surface obliquely that only light which is scattered at the outer surface of the hand resting on the support is coupled into an optical imaging beam path by a mirror. The imaging of the palm of the hand in its second dimension is generated by motor-actuated rotation of the mirror and by optics on an image sensor which is essentially one-dimensional, read out in the form of (overlapping) partial images and put together to form the output image.

It is disadvantageous that the papillary ridges are made visible and imaged using the principle of scattered light because residues from perspiration excreted by the hand must be meticulously removed in their entirety after every placement of the hand so that scattered light from old prints is not detected again.

U.S. Pat. No. 6,175,407 also discloses an arrangement for the optical recording of the papillary ridge patterns on the palm of a hand in which a cylinder of solid optical material (e.g., glass) is rotatably supported, prisms being arranged near the end faces of this cylinder in order to radiate illumination light at a flat angle to the outer surface of the solid cylinder and couple out illumination light on the opposite side in an optical imaging beam path.

The outer surface of the cylinder serves as a support for a portion of the palm that is placed thereon. By means of this arrangement, the image of the supported papillary ridges is made visible portion by portion using the principle of frustrated total internal reflection (FTIR) and imaged by optics on a one-dimensional image sensor. The second image dimension is scanned by rotating the solid cylinder by means of the hand and is assembled line by line to generate the output image. However, when the hand is moved too quickly over the cylindrical surface, i.e., when the angular velocity exceeds a maximum permissible velocity, the signal processing means of the image sensor are incapable of supplying image data so as to be synchronized with the rotating movement and, consequently, the output image is also not assembled correctly. For this reason, very complex additional arrangements are provided for measuring the angular velocity and for braking the cylinder when its given rotational speed is exceeded.

Another basic problem consists in that the palm must be moved exactly without relative movement between the palm and the cylinder surface in order to avoid drastic errors in assembling the output image. With regard to practical realization further disadvantages consist in that there are considerable difficulties in sealing the optical light paths at both end faces of the rotatable cylinder in the transition to the prisms for preventing malfunction due to dust and moisture.

Further, another prior art arrangement for optical recording of the patterns of palms according to publication US 2004/0109245 uses a conical optical body. The principle of frustrated total internal reflection (FTIR) is again used in that a rod with line-shaped illumination is arranged in a bore hole along the axis of symmetry of the cone and the area of the conical outer surface which is accordingly illuminated virtually in a line-shaped manner is imaged downward on a line sensor through the planar base surface of the cone by imaging optics. The sensor and the optics are rigidly coupled to a rotatable plate which, further, is fixedly connected to the rod of the line-shaped illumination and all three components are moved jointly around the axis of symmetry of the cone. In this way, the outer surface is scanned line by line along the surface lines of the cone and an image of the palm that is placed thereupon one time is outputted as a quantity of individual lines corresponding to the outer surface of the cone that is unwound in a plane. However, in order to convert the image to a rectangular format, a coordinate transformation and resampling of the entire image must be carried out. While this operation is uniquely determined and is relatively simple to describe mathematically, it necessarily leads to contrast gradients in the effective optical modulation transfer function (MTF). Therefore, the MTF must deliver a substantially higher contrast in the raw image than is required (after transformation) in the output image according to relevant standards. Accordingly, the technical requirements for optics and sensor are appreciably higher than in an arrangement using the cylinder principle. This means that technical expenditure is considerably higher; otherwise, only a lower image quality (resolution in dpi) can be realized in the output image.

OBJECT AND SUMMARY OF THE INVENTION

It is the primary object of the invention to find a novel possibility for recording the papillary ridge pattern of a hand which permits a complete optoelectronic image recording with one-time placement of the print surfaces of a hand without the use of illumination beam paths or imaging beam paths that are inadequately sealed against environmental influences and without having to accept a loss of resolution or an appreciably increased expenditure on electronics for rectification of the image recordings and with a support surface that is curved in an ergonomically advantageous manner.

In an arrangement for optoelectronic image recording of prints of large-area concave skin parts, particularly whole handprints, with an optical support body with a convex support surface for supporting the skin parts with large-area contact with the support surface in order to realize an image recording based on frustrated total internal reflection, a light source for illuminating the support surface and a readout beam path for transmitting totally internally reflected illumination light to an image sensor, the above-stated object is met, according to the invention, in that the support body has the basic shape of a cylinder around a cylinder axis, which cylinder is not necessarily complete, the support body has a cylindrical outer surface with a radian measure and radius which are sufficient to provide at least one freely accessible portion of the outer surface as support surface for the large-area concave skin portion, in that the support body has a first end face and a second end face, each having a conical recess which is arranged coaxially around the cylinder axis, a light source extending at least parallel to a surface line of the conical recess is arranged in the conical recess of the first end face, and an imaging beam path is connected to the conical recess of the second end face, which imaging beam path images a strip of the support surface that extends in a line-shaped manner along a lateral line of the outer surface of the support body on a linearly extending image sensor at a total internal reflection angle in an axial plane given by the cylinder axis and the scanned strip, and in that the linearly extending image sensor and the imaging beam path are rotatable synchronously around the cylinder axis of the support body in order to record successive line-shaped strips of the frustrated total reflection at the illuminated outer surface due to the skin parts contacting the support surface and to combine them to form a two-dimensional image of the skin part resting on the support body.

A cylinder sector, preferably a quarter-cylinder to a half-cylinder, is advantageously used as a support body.

A tube which is supported so as to be rotatable around the cylinder axis is advisably provided for synchronous rotation of the image sensor and elements of the imaging beam path. The tube is arranged outside the conical recess of the support body or in a cylindrical recess of the cylindrical support body, which cylindrical recess extends coaxial to the cylinder axis. For the latter variant, the imaging beam path is advantageously folded into the tube and the cylindrical recess by means of a reflecting surface.

A stepper motor is advisably provided for the successive rotation of the tube around the cylinder axis to move the imaging beam path and the image sensor for scanning a series of strips of the support surface of the support body.

When a linear light source is used for illumination in an advantageous variant, this light source is fastened to the tube at the first front side of the cylindrical support body rigidly and parallel to the top of the conical recess and therefore so as to be movable around the cylinder axis synchronous with the imaging beam path.

The suitably shaped light source advantageously has a diffuser arranged downstream thereof in order to generate an intensive background illumination on the inner surface of the support body at least along a surface line of the support surface. A floodlight or plane projector that is arranged along the surface of the conical recess of the support body can be suitable for illuminating the inner cylindrical surface of the support body with an intensive background illumination along the entire support surface.

The light source is advisably a collimated linear light source which is arranged so as to be rotatable along the surface of the conical recess synchronous with the imaging beam path in order to generate a strip of intensive background illumination along the surface lines of the support surface on the inner surface of the support body.

The imaging beam path has at least one imaging optics arrangement for imaging a strip of the cylindrical surface of the support body on the linearly extending image sensor.

Further, the imaging beam path advantageously contains at least one optical element for correcting the perspective distortion of the strip of the support surface imaged on the image sensor. This optical element can advisably be at least one wedge-shaped prism for at least partial correction of the distortion.

In an advantageous variant, the imaging beam path has two prisms for correcting the perspective distortion and a reflecting surface for folding the beam path. The reflecting surface can be that of a separate plane mirror or the reflecting surface is arranged on one of the prisms as a reflecting back surface. Further, the reflecting surface is advisably a totally reflecting back surface of a prism of high-refractive index glass which corrects the image distortion.

In another variant for partial optical correction of the perspective distortion of the image, the first prism can be suitably integrated in the cylindrical support body in that the angle between the support surface and the conical recess as exit surface of the imaging beam path is appreciably larger than the angle of the total reflection and than the corresponding angle of the conical recess on the side of the illumination beam path.

Further, it is possible that the imaging beam path has a curved mirror for partial correction of the perspective distortion and for folding the beam path.

Heating elements are advisably arranged over a large area on the delimiting surfaces of the shaped support body that are formed as planar cut surfaces by cutting a cylinder sector or a cylinder segment, preferably in order to prevent condensation (but also to soften hard skin).

Further, calibrating devices are advisably arranged on the outer surface of the support body outside the support surface and are covered at least with hoods which protect against touching contact, contamination and external light in order to calibrate and check the imaging beam path.

The invention is based on the fundamental ideas of the use of the optical principle of frustrated total internal reflection (FTIR) in the interest of greater robustness in relation to hand perspiration and dust and of the need to prevent a relative movement of the hand (rolling) on a curved recording surface. Therefore, according to the invention, the outer surface of a stationary cylindrical base body serves as a hand support surface and conically beveled end faces are used for illuminating and reading out a strip along a surface line of the cylindrical support surface. For successive scanning of strips along a plurality of cylinder surface lines, the scanning beam path with the linear image sensor and—in case of a linear light source—also the illumination arrangement are rotated step by step around the cylinder axis of the base body by means of a rotating mechanism. The entire recording process is realized in a few seconds by suitable synchronization of the mechanical scanning movement around the cylinder axis and the rate of the data readout of the image sensor so that the hand can be held motionless without difficulty for this period of time.

A cylinder sector is sufficient for snugly fitting the palm against the cylindrical support surface in an ergonomically favorable manner. A housing which seals the interior space of the optical readout arrangement relative to the external environment so as to be tight against dust and water adjoins the edge of the outer surface of this cylinder sector.

The solution according to the invention makes it possible to record the papillary ridge pattern of a hand by means of a fixed, ergonomic cylindrical support surface which enables a complete optoelectronic image recording by placing the print surfaces of a hand once upon the cylindrical support surface which has an illumination beam path and an imaging beam path that are sealed off from environmental influences. The recording surface, which has a slight loss of resolution only in one dimension when rectifying the image recording, can unwind in a plane immediately without image transformation and accordingly provides a direct access from the optoelectronically acquired curved image to the digital planar papillary ridge pattern.

Further, by applying the principle of FTIR which was previously limited to plane recording surfaces or entailed serious disadvantages, there are hardly any problems with hand perspiration or contrast. Further, the known problems caused by rolling the hand as was conventional heretofore are prevented by the synchronized scanning in the interior of the optical arrangement below the stationary hand.

The invention will be described more fully in the following with reference to embodiment examples.

DESCRIPTION OF THE PREFERRED EMBODIMENTS

Figure 1:
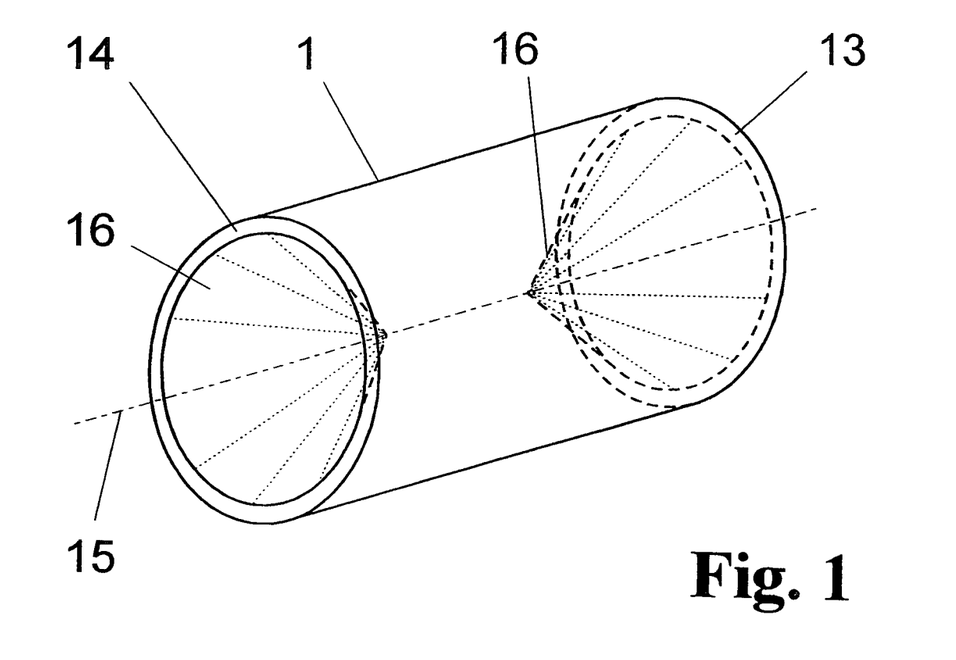
FIG. 1 is a schematic view of a base body for frustrated total internal reflection with a cylindrical support surface with conical recesses concentric to the axis of the cylindrical support surface of the base body.
Figure 2:
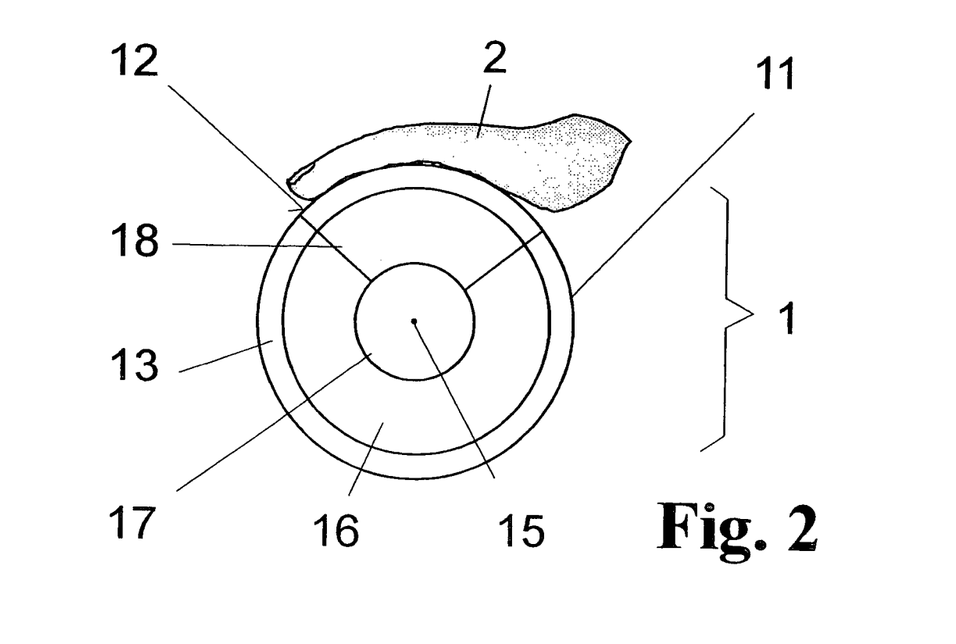
FIG. 2 shows a side view of the base body from FIG. 1 with a cut out cylinder sector for defining a sufficient support surface for the palm of a hand and a central cylindrical recess along the cylinder axis.

As regards its basic construction, the invention contains, as the core of the optoelectronic recording device, a specially constructed optically transparent support body as is shown in FIG. 1 for recording large-area prints of skin parts of the fingers 21 or of the entire hand 2 (only in FIG. 2). This cylindrical support body 1 is made of optical material (glass or plastic) in which at least a portion of the outer surface area 11 is provided as a support surface 12 for the hand 2 in such a way that the concave palm of the hand snugly contacts the outer surface 11 of the scanning body 1.

Conical recesses 16 are arranged coaxial to the cylinder axis 15 in the two end faces 13 of the body 1 for coupling in the illumination beam path 3 on the one hand and for coupling out the imaging beam path 4 on the other hand so that the frustrated (because of the hand placed thereon) total reflection (FTIR) of a strip 41 (see FIG. 9 or FIG. 10) along a lateral line of the outer surface 11 can be recorded.

Figure 3:
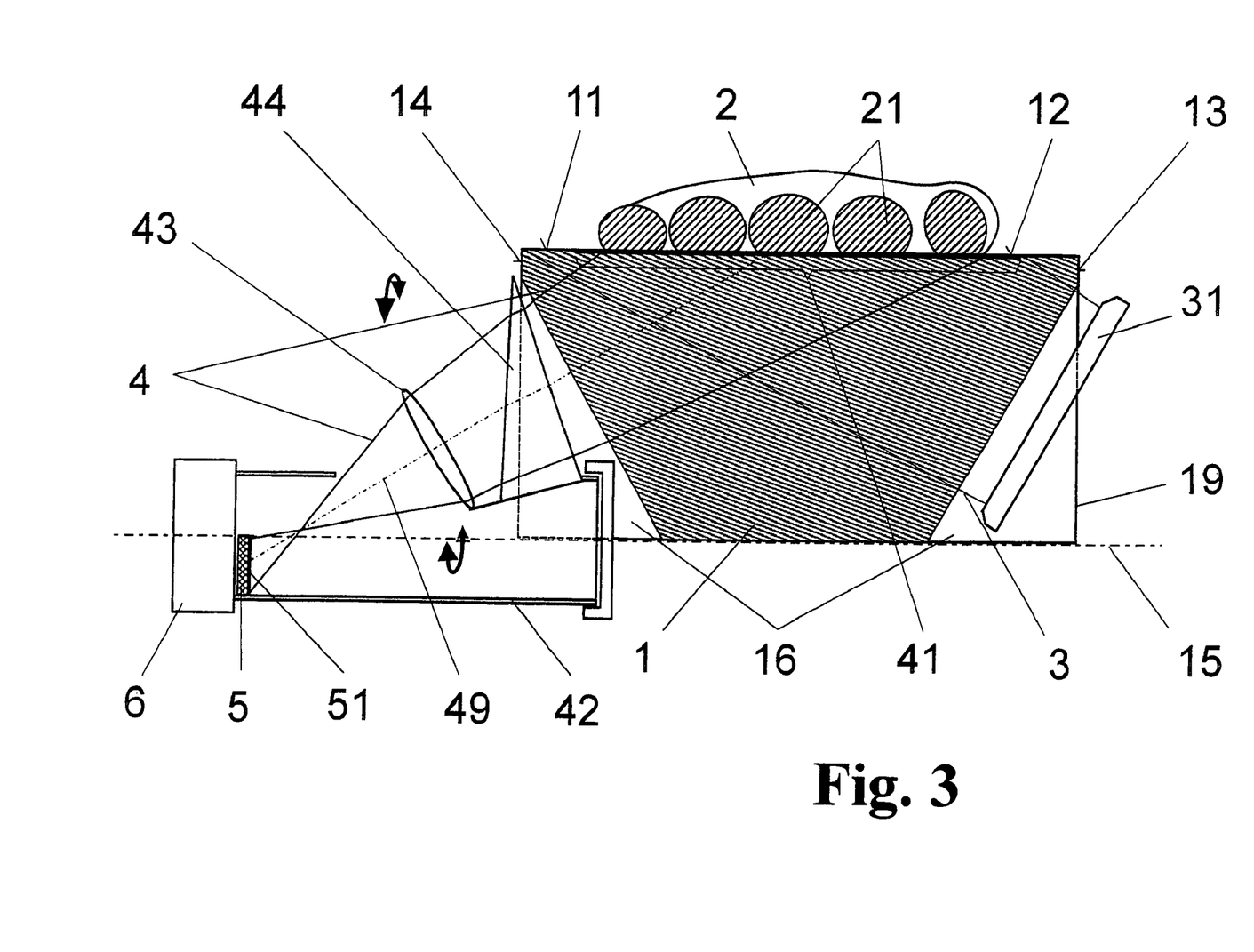
FIG. 3 shows a schematic view of the arrangement according to the invention with a support body as is indicated in FIG. 2 but with a cylinder sector shaped as a half-cylinder and with scanning along surface lines of the half-cylinder, the elements of the imaging beam path being rotated around the cylinder axis.

As is shown in FIG. 2 in a side view of FIG. 1, another cylindrical recess 17 is preferably provided at the body 1 concentrically around the cylinder axis 15 in order to guide an imaging beam path 4 (shown only in FIGS. 4 to 8) that is folded by reflecting elements to an image sensor unit 5 (shown only in FIG. 3). Therefore, in order to realize a compact constructional form of the arrangement, as is shown in FIGS. 4 to 8, the folded recording beam path 4 and/or illumination beam path 3 can be rotated in a simple manner around the cylinder axis 15 in order to scan different strips 41 of the support surface 12 (as a portion of the outer surface 11) successively in progression in circular direction with any density and deliver a series of linear pixel rows from the image sensor unit 5. A tube 42 (see FIGS. 4 to 9) can be inserted in the additional recess 17 for oriented fastening and joint rotation of all optical components of the imaging beam path 4 around the cylinder axis 15.

Since not more than the outer surface 11 of a half-cylinder 19, or even less (see FIG. 2, 9 or 10), is needed as a recording surface 12 for the entire palm of a hand 2, the support body 1 is advantageously constructed only as a cylinder sector 18. The cylinder sector 18 is produced by cutting a solid cylinder along its longitudinal axis, e.g., into halves, thirds or fourths, and so on. According to the axial sectional view in FIG. 3, the resulting cylinder section 18 appears as a prism with a cut off tip.

Accordingly, in FIG. 3 (and all of the other subsequent figures) the light input and image readout are carried out in the same way as in a prism, but separately, substantially only in one dimension for every axial plane of the cylinder sector 18 because the entrance surface and exit surface, as outer surfaces of the conical recesses 16, are conical.

The cylinder sector 18 is held in a device housing (not shown) in a stationary manner and the holders seal the outer surface 11 of the cylinder sector 18 relative to the interior space (below and to the side of the support surface 12) so as to be tight against dust and sprayed water.

On the one hand, for light input, a light source 31 for generating an intensive background illumination on the inner surface 11 of the cylinder sector 18 and, on the other hand, a linearly extending image sensor 51 of an image sensor unit 5 are arranged at the conical recesses 16 of the cylinder sector 18 parallel to the cone surface lines of the conical recesses 16, which cone surface lines are visible in the axial section shown in the drawing. This light source 31 and linearly extending image sensor 51 make it possible to scan a strip 41 of the support surface 12 (portion of the outer surface 11 that is freely accessible for placement of the hand) within one and the same axial section of the cylinder sector 18 and are moved circularly in succession around the cylinder axis 15 in order to obtain an image of the skin parts of the hand 2 resting on the support surface 12, which image is assembled from the individual strip scans.

The imaging beam path 4 of the strip 41 extending parallel to a surface line of the cylinder sector 18 to the linearly extending image sensor 51 contains at least one imaging optics arrangement 43 and, due to the fact that the image is considerably distorted optically, at least one optically correcting element (in this case, the prism 44) for at least partial optical rectification of the image. In the present example according to FIG. 3, there is a further (partial) correction of distortion by means of an inclined position of the image sensor 51 relative to the optical axis of the imaging optics 43 making use of the Scheimpflug condition.

The entire imaging beam path 4 is coupled to a rotatable tube 42 whose axis of rotation corresponds to the elongated cylinder axis 15 and which—as is shown in FIG. 3—rotatably holds all of the components of the imaging beam path 4 for optical transmission of the image of the strip 41 from the support surface 12 to the image sensor unit 5 and receives them such that they are fixed relative to one another. The tube 42 is supported so as to be rotatable around the cylinder axis 15 and is moved in a defined manner by steps around the cylinder axis 15 by means of a stepper motor 6 at least in the angular area of the cylinder sector 18. This movement may be a swiveling movement between two end points or a revolving rotational movement with intermittent scanning and/or illumination outside the cylinder sector 18.

The background brightness that is conventional with frustrated total reflection is supplied by the light source 31 at a flat incident angle. The background illumination is reflected by the surface 11 of the cylinder sector 17 (that is, the support surface 12 for the hand 12) and recorded by the imaging beam path 4 in a line-shaped manner as a strip 41 insofar as no papillary ridges of the palm of the hand interfere with total reflection. The total reflection is partially frustrated by the papillary ridges of the skin so that no light from the light source 31 is imaged by the imaging beam path 4 on the image sensor 51 from these locations.

In this example, the light source 31 is suitably adapted to the shape of the conical recess 16 introduced in the first front side 12 and is oriented parallel to its surface lines.

Figure 4:
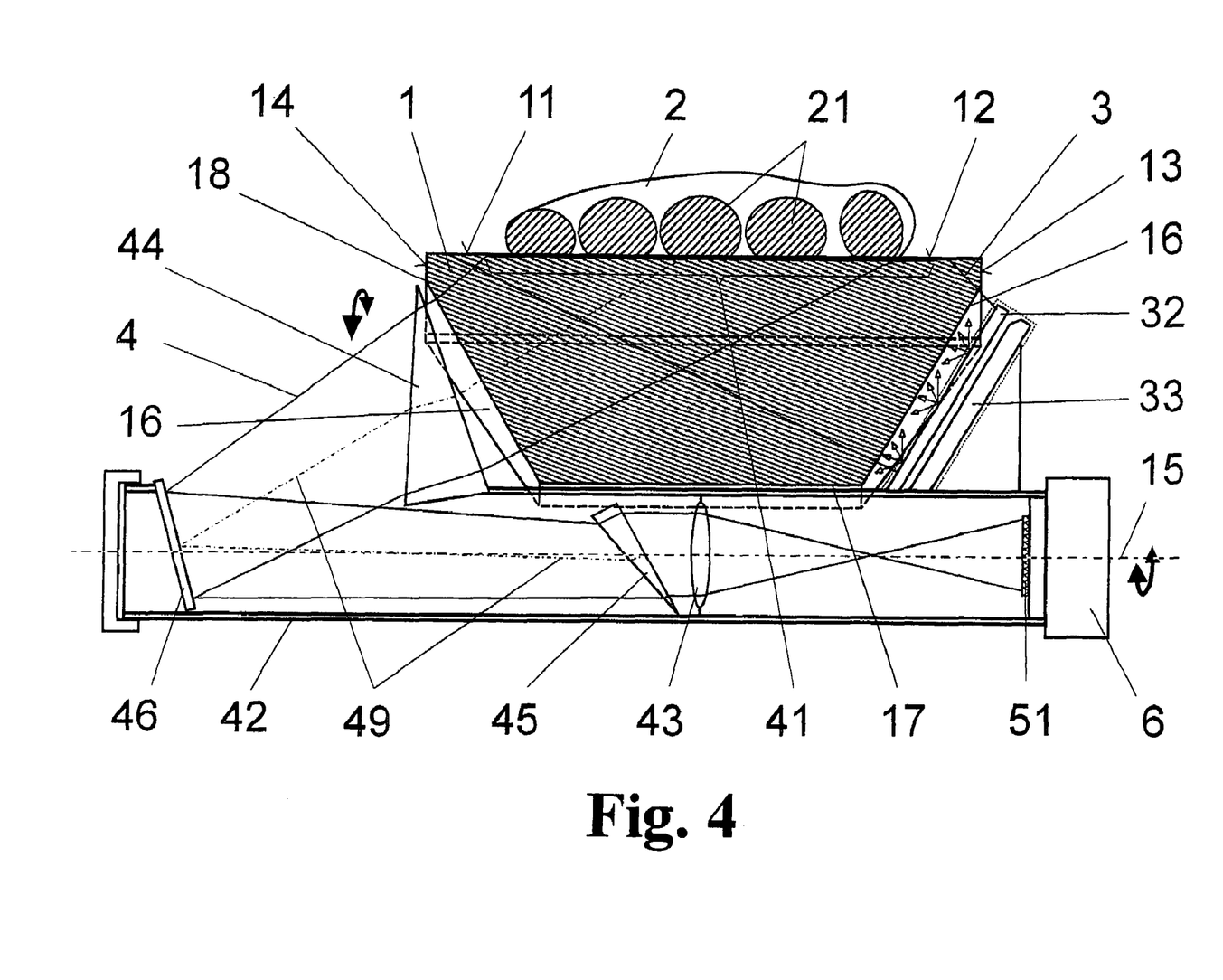
FIG. 4 shows an embodiment form of the invention using a scanning body (according to FIG. 2) and a plane mirror for folding the readout beam path into a tube along the cylinder axis and optical wedges (prisms) for complete correction of the perspective error.

When the illumination beam path 3 contains only a linear light source 33 (which is entirely sufficient because the imaging is only carried out strip by strip), this light source 33 would likewise have to communicate with the tube 42 so as to be rotatable around the cylinder axis 15 as is shown, e.g., in FIG. 4. When using a linear light source, directed illumination can also be advantageously used for more intensive illumination of the imaged strip 41.

When a hand 2 or a finger 21 rests on the support surface 12, the image of the strip 41 is imaged with frustrated total reflection by imaging optics 43 in the interior of the tube 42 on an image sensor 51. The stepper motor 6 moves the tube 42 and all of the elements fastened thereto, such as imaging optics 43, prism 44 and image sensor 51, synchronously in small angular steps to discrete positions. The image of the newly adjusted strip 41 is recorded in the stationary position of the tube 42 and is subsequently read out from the image sensor 51. During the readout, the stepper motor 6 moves the tube 42 into the next scanning position. The position of the scanned strip 41 in the object field, i.e., along the (inner) cylindrical surface 11 of the cylinder sector 18, is moved laterally (circularly) by the positioning device. The step size is selected in such a way that the desired resolution (e.g., 1000 ppi) is achieved on the support surface 12.

The size of the support surface 12 to be scanned for a hand 2 is given as height times width by 203.2 mm×139.7 mm (8"×5.5"). The width accordingly defines the length of the strip 41 to be scanned optically along the surface line 11 of the cylinder sector 18 and the height gives the scanning path of successive scans of strips 41 orthogonal to the direction of the surface lines of the cylinder surface 11. Depending on the radius of the cylinder sector 18, this gives the maximum angle around which the tube 42 must rotate in order to completely scan the prescribed "height" of the support surface 12. Therefore, at 1000 ppi, images with a size of 5500 pixels (width) times 8000 pixels (height) are supplied by the scanner. With a radius of 200 mm, very good results are obtained because the palm of the hand can then rest snugly against the cylindrical outer surface 11 of the support body 1. With smaller radii, the palm of the hand rests more snugly but there is increased deformation of skin parts.

In order not to make excessive demands on the imaging optics 43, methods are employed to correct the geometric distortions (particularly the non-uniform imaging scale in the transverse direction of the hand 2) and the unevenness of illumination (intensity) and sensitivity distribution of the image sensor 51. To this end, an image sensor 51 is used which has substantially more than the required 5500 pixels, e.g., 8000 pixels (e.g., Eastman Kodak Corp., USA), in direction of the imaged strip 41. The correction can then be carried out in a real-time logic circuit which is arranged directly downstream of the image sensor 51 and an added analog-to-digital converter, and the prescribed row lengths of 5500 pixels are generated from the pixel data stream of 8000 pixel row lengths.

Operation is carried out in the rotating direction of the imaging beam path 4 without correction of geometric errors. The stepper motor 6 is selected in such a way that its positioning steps can be adjusted sufficiently closely and exactly (reproducibly). The perspective imaging error of the imaging beam path 4 causes an imaging of the image sensor 51 by means of the imaging optics 43 in the support surface 12 (that is, in the outer surface 11 of the cylinder sector 18) with broader pixels on the side facing the illumination beam path and narrower pixels on the opposite side. Therefore, the MTF in the support surface 12 depends on the location along the surface lines of the cylinder sector 18. This dependency can be ignored when the MTF reaches the required minimum value even in the worst case, that is, on the side of the illumination beam path 3. These minimum values of the MTF are set forth, for example, in the image quality standards of large police organizations (e.g., the FBI in the USA, the NPA in Japan) and must be achieved in a verifiable manner by the device within the framework of device certification.

When a line sensor 52 is used as an image sensor unit 5—as is shown in FIG. 4—and is operated, e.g., at 30 MHz, a complete scan over the entire scanning surface 12 requires a period of 2.8 s (not including idle time). The time for the scanning of a strip 41 is about 0.5 ms.

With such short scan times for a strip 41, the sensitivity of the line sensor 52 is very low compared with surface sensors (such as are used with flat scanners). This should be counteracted by means of an intensive linear (line-shaped) light source 33. High-intensity LEDs or laser diodes whose light is collimated in the row direction in addition can be used for this purpose.

For users who place particular importance upon a uniform MTF in the entire object field, the perspective distortion of the imaging on the line sensor 51 can also be completely corrected by optical means.

FIG. 4 shows an arrangement which is suitably expanded for this purpose and which has a folded imaging beam path 4 with correction elements. A quarter-circle cylinder sector 18 is used as an optical support body 1. The cylinder sector 18 is shown in the drawing plane as an axial section in which the linear image scanning is carried out.

In this example, the illumination beam path 3 has a linear light source 33 with a diffuser 32 which is placed in front of it and which is fixedly connected to the tube 42 and is therefore moved synchronously with the components of the imaging beam path 4 so that a narrow area of the outer surface 11 (the strip 41 to be imaged) is irradiated intensively through the illumination-side conical recess 16 always so as to revolve stepwise with the imaging. LED array arrangements or linearly expanded laser diodes can be used as linear light sources 33.

The imaging beam path 4 is represented by the optical axis 49 (of the imaging optics 43) and by the marginal rays A1 and A2 of the imaged strip 41 of the hand 2, where A1 lies on the side of the illumination beam path 3 and A2 lies on the opposite side. Geometric rectification seems advisable in view of the perspective distortion caused by the large angle of the total reflection. This geometric rectification can be carried out completely in the imaging beam path 4 by means of a first prism 44 and a second prism 45. When the correction of distortion is not carried out completely optically, subsequent electronic correction can also be carried out (e.g., provided in embodiment variants according to FIGS. 7 and 8).

In this case, the tube 42, as the support member for the rotation of the illumination beam path 3 and the imaging beam path 4, is arranged below the entire support body 1 so as to be rotatable concentric to the outer surface 11 in another recess 17 of the cylinder sector 18, which recess 17 provides a free space for the tube 42 cylindrically around the cylinder axis 15.

The strip-by-strip imaging of the supported hand 2 undergoes a partial correction of the perspective distortion by the first prism 44 before the imaging beam path 4 is folded into the tube 42 by a plane reflecting surface 46 and the second prism 45 takes over the rectification of the image which takes place completely optically in this case. The second prism 45 provides at the same time for the orientation of the imaging beam path 4 to the imaging optics 43 whose optical axis 49 lies parallel to the axis of symmetry of the tube 42 and to the cylinder axis 15 and which images the linear strip 41 on the line sensor 52. Since the imaging is carried out on a line sensor 52, the two prisms 44 and 45 can be constructed so as to be very narrow. This minimizes the dimensions, which is also advantageous with respect to the requirements for the rotary drive (stepper motor 6).

When fingers 21 or the entire hand 2 are resting on the support surface 12, the total reflection—equivalent to the full-surface imaging with a planar supporting prism—is frustrated along the currently scanned surface line of the cylindrical outer surface 11 and the light-dark pattern is acquired in one dimension by the line sensor 52. Since the two prisms 44 and 45 are fixedly connected to the tube 42, they rotate synchronous with the line sensor 52 and objective 43 around the cylinder axis 15 so that images of strips 41 adjoining one another as tightly as desired can be recorded from the entire support surface 12 along the outer surface 11 of the cylinder sector 17 successively in time by means of step-by-step rotation of the tube 42.

An alternative solution is also made possible by the arrangement in FIG. 4, wherein the prism 44 is arranged in a stationary manner as a circle segment with a radial thickness increase directly downstream of the conical recess 15 and does not move along with the tube 42. Optically, this alternate variant with stationary prism 44 results in a completely geometrically corrected image exactly the same as the prism 44 (shown in FIG. 4) that is rotated along by the tube 42.

Figure 5:
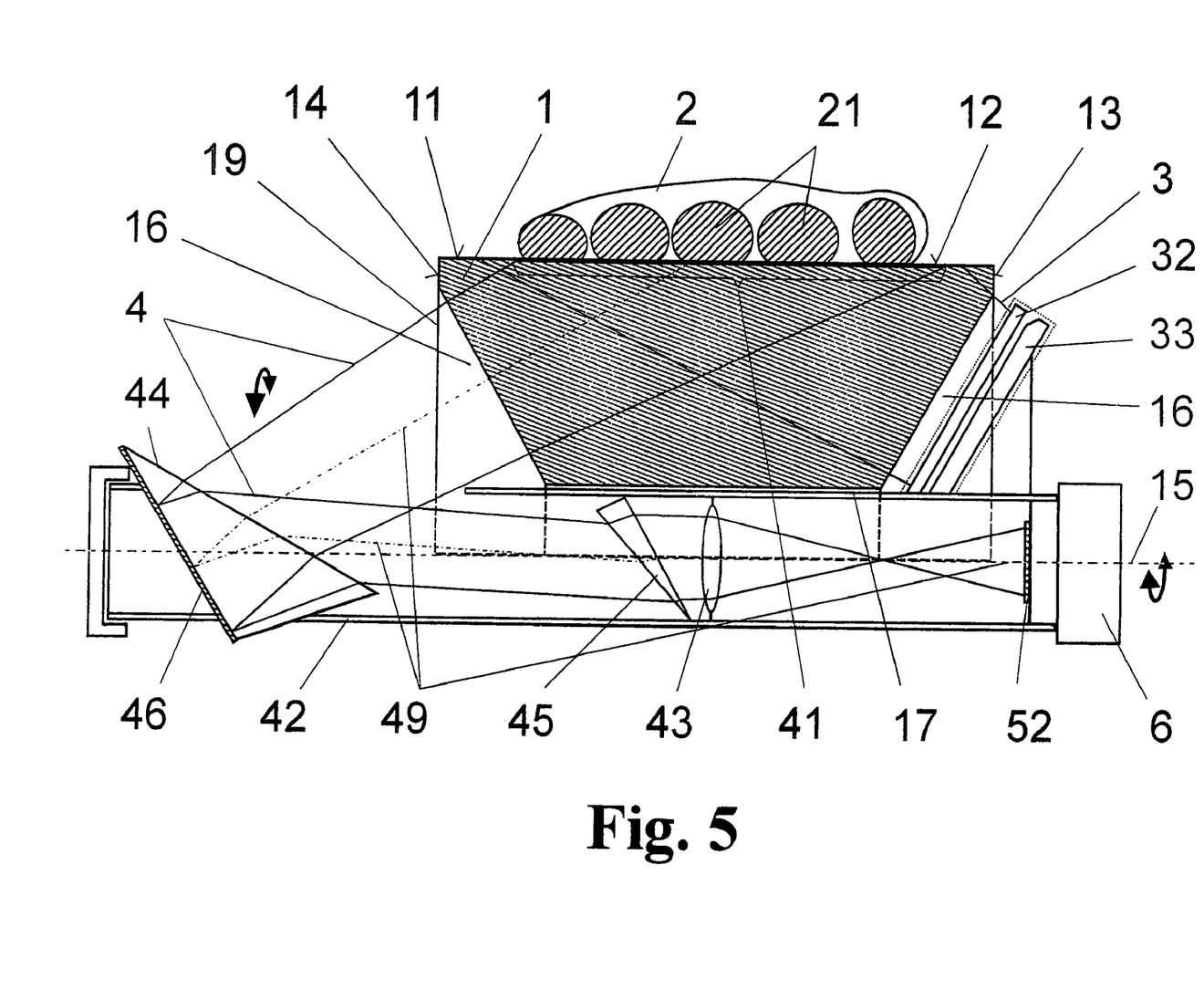
FIG. 5 shows a construction of the invention with a support body according to FIG. 3 using a mirror prism and a transmission prism for complete correction of the perspective imaging error.

FIG. 5 shows a cylindrical body 1 in the form of a half-cylinder 19. In this example, a linear light source 33 is again used. This linear light source 33 is fixedly connected to the tube 42 and is accordingly moved synchronously together with the components of the imaging beam path 4.

In the imaging beam path 4, the first prism 44 is provided directly with a reflecting surface 46 on its back. This reflecting surface 46 is preferably damped. The prism 44 accordingly serves for beam deflection and as a correction element. All the rest of the elements and functions are the same as described in FIG. 4.

The construction according to FIG. 6 again starts with a cylinder sector 18, for example, a quarter-cylinder with conical recesses 16 and a cylindrical recess 17. In this variant of the invention, a totally reflecting prism 47 is made from a high-refractive index material and can carry out a (partial) rectification of the image as well as folding the imaging beam path 4.

Figure 6:
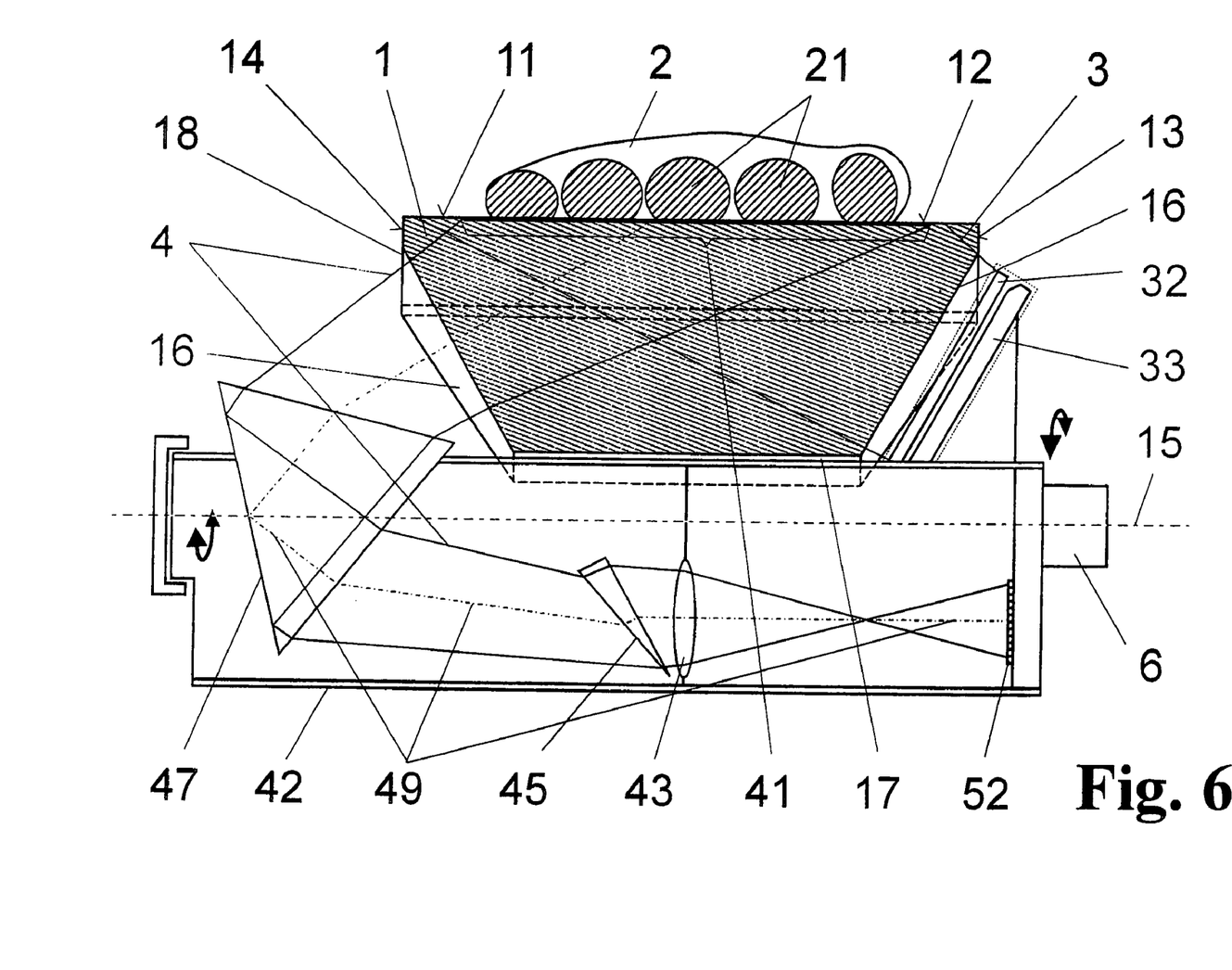
FIG. 6 shows a modified embodiment form according to FIG. 5 with a high-refraction index prism in total reflection and an optical wedge for correcting the perspective imaging error.

In contrast to FIG. 5, no separate reflective coating 46 is needed in FIG. 6 because the high-refractive index optical material (e.g., heavy flint glass, where n=1.8) enables total reflection at the back surface of the prism 44. Since the folding of the imaging beam path 4 is carried out at a substantially flatter angle in this case, the tube 42 is designed with a larger diameter and has an eccentrically arranged axis of rotation along the cylinder axis 15. As in the previous examples, the stepper motor 6 carries out the rotating movement of the imaging beam path 4 (including the line sensor 52), in this case together with the linear light source 33, around the cylinder axis 15.

Figure 7:
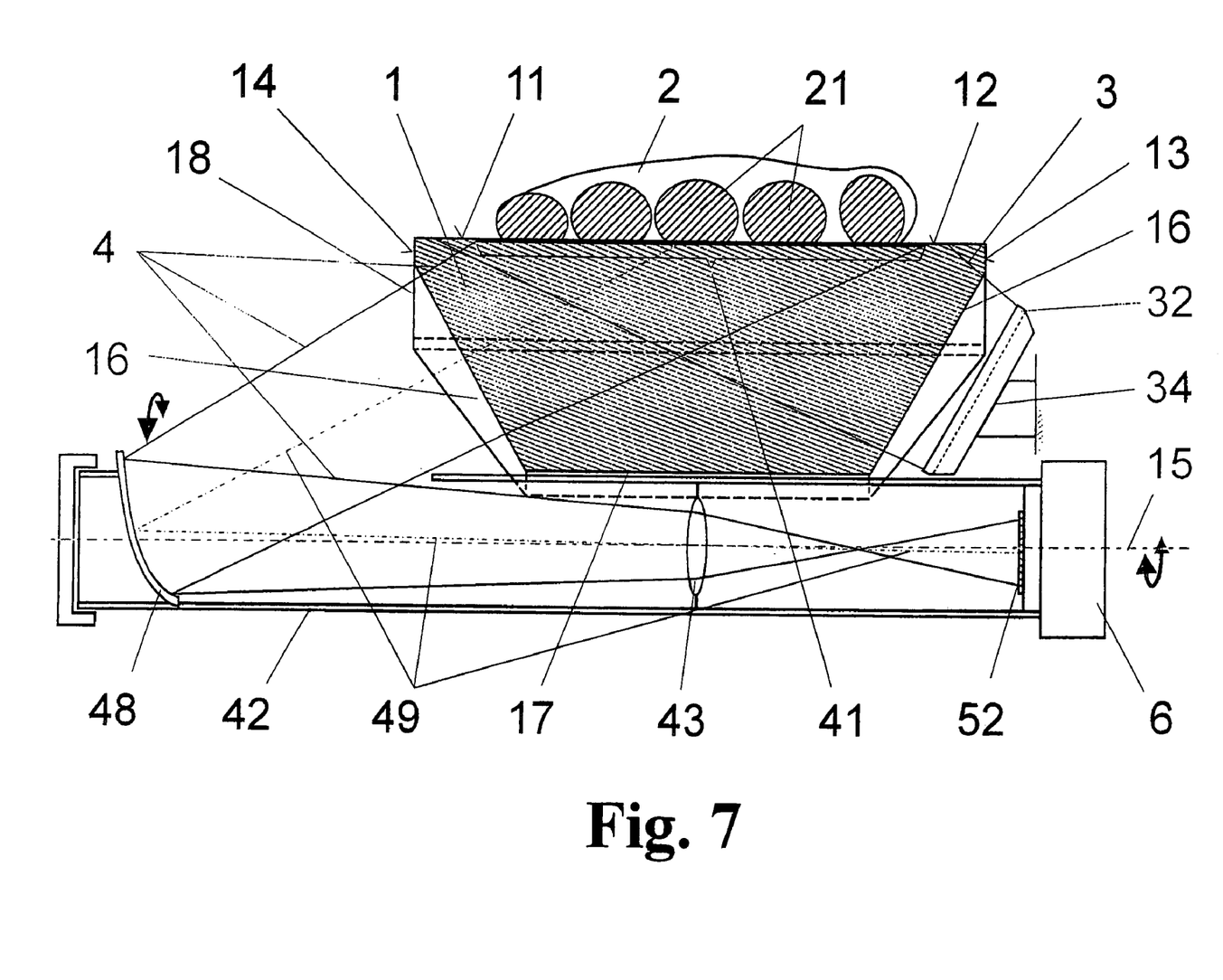
FIG. 7 shows an embodiment form of the invention according to FIG. 3 with a curved mirror for folding the readout beam path and partial correction of the perspective imaging error.

The construction of the arrangement in FIG. 7 differs from the previous arrangements above all in that there is no complete rectification of the image within the optical beam path 4. In this example, the tube 42 is again rotatable concentric to the cylinder axis 15 and has, in addition to the line sensor 52 and imaging optics 43, only a curved mirror 48 for folding the beam path 4 and for partial correction of the distortion of the image. The rest of the rectification of the image can be carried out electronically in a simple manner.

Further, in contrast to FIGS. 4 to 6, the illumination beam path 3 has a plane projector 34 which, although it contains a diffuser 32, intensively irradiates the entire area of the illumination-side conical recess 16 in a stationary manner.

Figure 8:
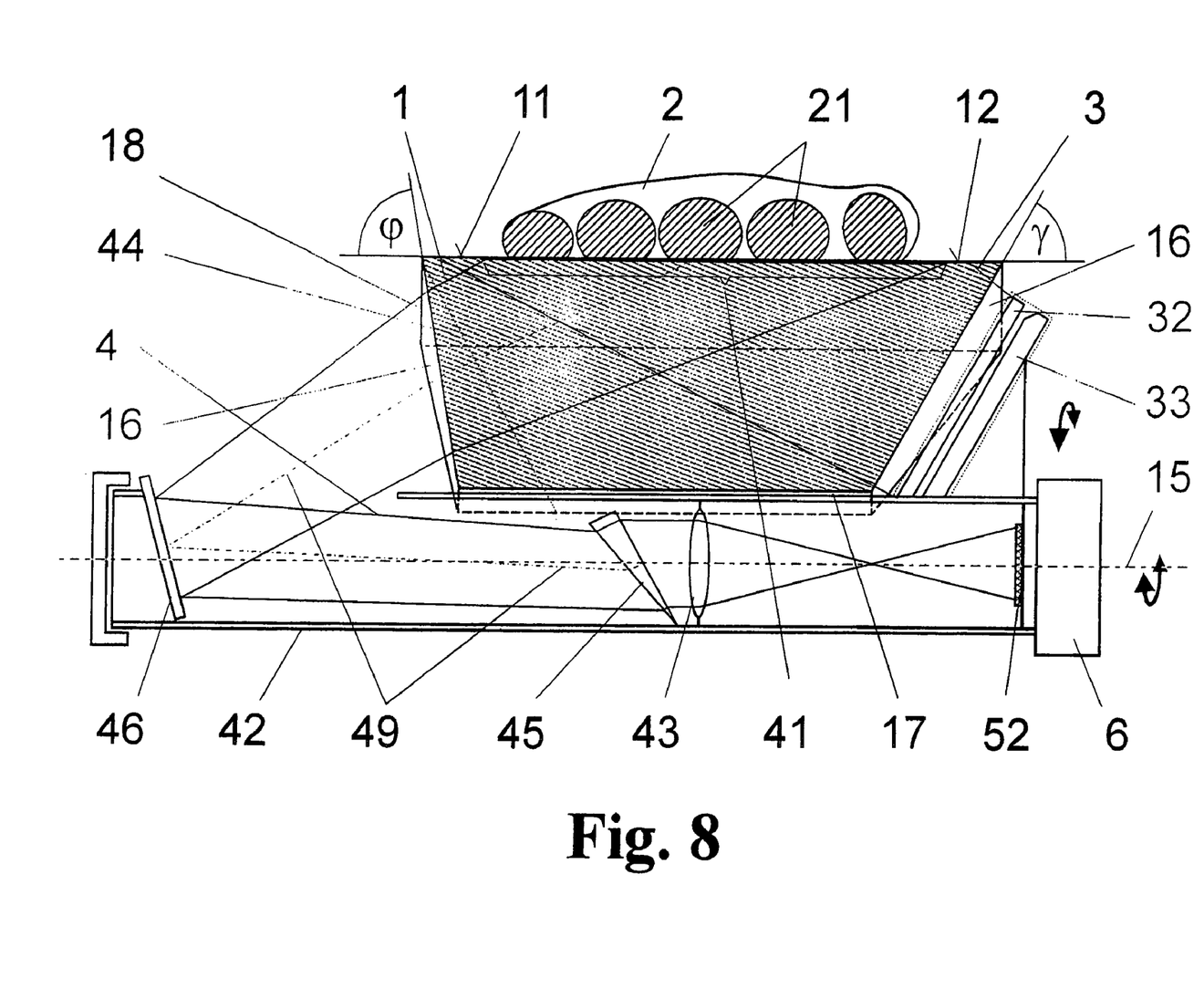
FIG. 8 shows a modified embodiment form according to FIG. 4, but with only partial correction of the perspective error by means of a cylinder sector which serves as support body and which has an adapted, flatter angle of inclination of the conical recess for the exit of the imaging beam path.

FIG. 8 shows another variant of the invention in which the image distortion is only partially optically corrected in the imaging beam path 4. In this case, the partial correction is achieved in that the angle φ of the conical recess 16 at the readout side of the support body 1 relative to the outer surface 11 is selected so as to be appreciably larger than the corresponding angle γ at the side of the illumination beam path 3 so that the occurring path length differences and the resulting perspective distortion—depending upon the refractive index of the glass that is used—are partially compensated. Optically, the change in the angle φ of the conical recess 14 means a first prism 44 which is added directly to the support body 1 (although its effect is diminished) and whose deficient correction cannot be sufficiently compensated by the second prism 45. Therefore, a complete correction cannot be achieved. For this purpose it would be necessary to use additional optical elements such as additional prisms or a curved mirror 48 (as in FIG. 7) instead of the plane reflecting surface 46. The rest of the rectification of the image can then also be carried out electronically in a simple manner as was already mentioned above.

In order to assist in the correct placement of the hand on the support surface 12, a special operating mode can be provided for all of the variants of the invention described above in which the tube 42 makes larger angular steps (for example, eight times larger than in a "normal" scan) and, further, eight pixels in the longitudinal dimension of the image sensor 51 are combined to form a pixel signal. The resulting image is accordingly eight times smaller in both dimensions: (W)×(H) =687×1000 pixels, that is, comprises only 1/64 of the amount of data. This reduced image can be read out eight times faster and is accordingly available after only 0.35 s. In a repeating scan operation in which the stepper motor 6 permanently rotates the tube 42 back and forth similar to the movement of a windshield wiper, about three images of this type with reduced resolution can be recorded per second. Therefore, by immediately displaying these images on a connected image screen (not shown), the user has a kind of quasi-live image for monitoring the correct complete placement of the palm of a human hand 2 on the support surface 12.

Figure 9:
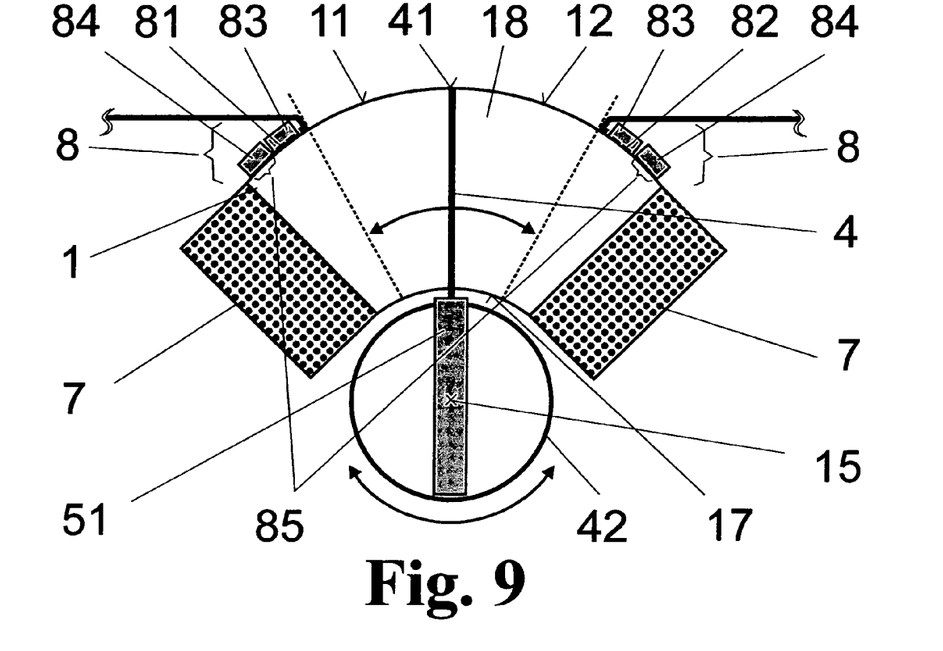
FIG. 9 shows a side view of FIGS. 4, 6, 7 or 8 with a cylinder sector (e.g., a quarter-cylinder) as scanning body, with calibrating devices and heating elements.
Figure 10:
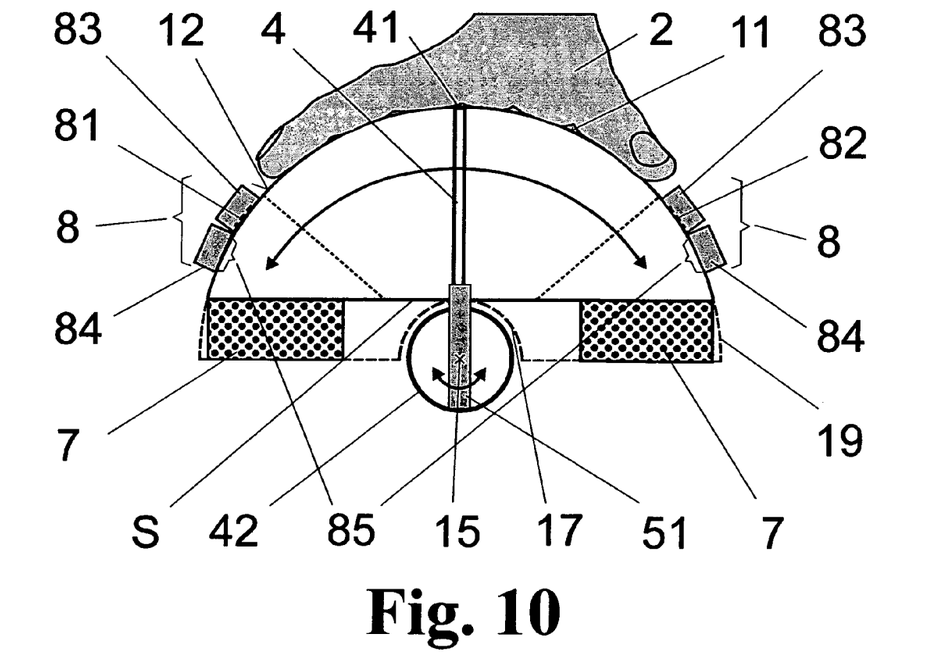
FIG. 10 shows a side view corresponding to FIGS. 3 and 5 with a support body in the shape of a half-cylinder which is shortened by the radius of the cylindrical recess, with calibrating devices and heating elements and with a schematic depiction of a specific technique for supporting the hand.

FIGS. 9 and 10 show further embodiments in a side view and cross section, respectively, of arrangements described above which make the application of the invention reproducible and more reliable.

First, the cylindrical optical support body 1 is brought into contact at its "longitudinal sectional surfaces" (when a cylinder section 18 is generated from a solid cylinder) with heating elements 7 and is accordingly heated in a deliberate manner.

The heat from the heating elements 7 propagates in the optical support body and after a certain heating period leads to the uniform heating of the outer surface 11. This serves to prevent condensation in cold environments and, by softening hard skin and stimulating a spontaneous excretion of perspiration by the supported hand 2, supports high-contrast image recording. The heating elements 7 which can preferably be adjustable electric heating elements (resistors, transistors, or the like) are shown schematically in FIG. 9 as area heaters which are arranged over the full surface of the radially oriented surfaces of the support body 1 which is a quarter-circle cylinder sector 18 in this example.

FIG. 9 further shows calibrating units 8 by means of which the image quality parameters can be tested and monitored by arranging calibrating marks 81 and 82 on both sides outside the support surface 12 at different locations on the outer surface 11 of the cylinder sector 18. These calibrating marks 81 and 82 can contain MTF test structures and geometry test fields. To protect against environmental influences, each of these areas is covered by a hood 83 and possibly also by the device housing (not designated by a reference number). The hood 83 can be very flat and only ensures that the test structures cannot be touched and can be imaged accurately on the linearly extending image sensor 51 by the imaging beam path 4.

FIG. 9 further shows an advantageous variant of the arrangement according to one of the preceding FIGS. 4, 6, 7 or 8 in cross section, The optical support body 1 is constructed as a quarter-circle cylinder sector 18. At a predetermined length of 203.2 mm (8") for the support surface 12 of the hand 2, the outer surface 11 extends around the cylinder axis 15 in corresponding manner. This dimension of the support surface 12 is scanned in the area delimited by dashes by a back-and-forth rotation of the image sensor 51 (and of the imaging beam path 4 which is visible here only as a tube 42).

The calibrating marks 81 and 82 are arranged on the outer surface 11 immediately outside of this portion of the cylinder sector 18 and are covered by the hood 83 for protection. In addition, there are calibrating marks 85 under additional hoods 84 which differ from calibrating marks 81 and 82 in that there are no calibration patterns under the hoods 84 but rather only an empty partial surface of the outer surface 11. These hoods 84 protect the calibrating surfaces 85 from touching, soiling and external light.

The empty calibrating surfaces 85 under the hoods 84 are used to determine the intensity distribution of the line-shaped background illumination. For this purpose, when the tube 42 is rotated in such a way that the image sensor 51 "sees" exactly this area the calibrating data are read out and stored in order to be used for determining correction values. An existing non-uniformity of the light source 31, or one occurring in the course of operation, shading of the imaging optics 43 by edges or a non-uniform pixel sensitivity of the image sensor 51 can be corrected with the correction values.

In order to detect the calibrating marks 81 and 82, the tube 42 is moved by means of the stepper motor 6 (not visible in FIG. 9) in such a way that not only the portion located below the hoods 83 and 84 is recorded, but a scan is carried out from the covered areas of the hoods 83 and 84 on one side over the support surface 12 to the covered areas of the hoods 83 and 84 on the other side. This separate calibrating scan results in a two-dimensional image of the calibrating marks 81 and 82. With correspondingly formed marks 81 and 82 at other locations along the outer surface 11 (extending orthogonal to the drawing plane) a number of important parameters for the image quality can then be calculated automatically from the calibrating image data. Similar advantageous solutions are described in EP 11 01 187 and are incorporated herein by reference.

The construction according to FIG. 10 can be interpreted as a side view of FIG. 3 and FIG. 5 in that a half-cylinder 19 is used as a support body 1 in this embodiment example. The available "height" of the support surface 12 is accordingly enlarged or this same surface area, e.g., H×W=203.2 mm×139.67 mm (8"×5.5"), can be produced with a smaller radius of the half-cylinder 19 and accordingly with a greater curvature of the support surface 12. In the latter case, there is the added possibility of improved acquisition of the thumbprint of a hand 2 in the gripping position. A corresponding attitude of the hand is shown schematically in FIG. 10.

But a special feature in this example consists in that the cylinder sector 18 (in this case a half-cylinder 19) was shortened to economize on the cylindrical recess 17. This possibility is also offered for all of the preceding examples (also in the smaller cylinder sectors) in that, instead of the cylindrical recess 17, it is possible simply to provide a straight section S (parallel to the two straight edges of the outer surface 11) to create the required space for the tube 42 (or differently shaped holders) for the imaging beam path 4 which is rotatable around the cylinder axis 15. However, the straight section S may only shorten the height of the half-cylinder 19 (or of the cylinder sector 18) to the extent that the imaging beam path 4 can still always exit from the conical recess 16 during its rotating scanning movement. In particular, this condition must also be met outside the support surface 12 for the scan of the calibrating units 8; however, these calibrating units 8 can be made accessible to complete imaging in a simple manner by means of suitable spatial arrangement along the cylinder length.

All of the rest of the details in FIG. 10 such as the heating elements 7 and calibrating units 8 are provided in the same way as was described with reference to FIG. 9, the only difference being the enlarged scan angle between the two dashed lines which delimit the freely accessible support surface 12 and therefore create an elongated support surface 12 which is particularly suited to the special manner of supporting the hand 2.

The optical body 1 (cylinder sector 18 and half-cylinder 19) can be made of glass or optical plastic. In order to protect against scratching—particularly on plastic material—a coating is applied or the support surface, when not in use, can be completely protected by a correspondingly curved cover.

While the foregoing description and drawings represent the present invention, it will be obvious to those skilled in the art that various changes may be made therein without departing from the true spirit and scope of the present invention.

Reference Numbers 1 support body
11 surface
12 support surface
13 first end face
14 second end face
15 cylinder axis
16 conical recesses
17 additional (cylindrical) recess
18 cylinder sector
19 half-cylinder
2 hand
21 finger
3 illumination beam path
31 light source
32 diffuser
33 linear light source
34 plane projector
4 imaging beam path
41 strip
42 tube
43 imaging optics
44 first prism
45 second prism
46 reflecting surface
47 prism (of high-refractive index glass)
48 curved mirror
49 optical axis
5 image sensor unit
51 (linearly extending) image sensor
52 line sensor
6 stepper motor
7 heating element
8 calibrating devices
81, 82 calibrating marks
83, 84 hood
85 calibrating surface
A1, A2 marginal ray
S section plane

What is claimed is:

1. An arrangement for optoelectronic image recording of prints of large-area concave skin parts, particularly whole handprints, comprising:
    an optical support body with a convex support surface for supporting the skin parts with large-area contact with the support surface in order to realize an image recording based on frustrated total internal reflection;
    a light source for illuminating the support surface;
    a readout beam path for transmitting totally internally reflected illumination light to an image sensor;
    said support body having the basic shape of a cylinder around a cylinder axis;
    said support body having a cylindrical outer surface with a radian measure and radius which are sufficient to provide at least one freely accessible portion of the outer surface as support surface for the large-area concave skin part;
    said support body having a first end face and a second end face, each having a conical recess which is arranged coaxially around the cylinder axis;
    said light source extending at least parallel to a surface line of the conical recess and being arranged in the conical recess of the first end face;
    said readout beam path including an imaging beam path which is connected to the conical recess of the second end face, which imaging beam path images a strip of the support surface that extends in a line-shaped manner along a lateral line of the outer surface of the support body on said image sensor, which is a linearly extending image sensor, at a total internal reflection angle in an axial plane given by the cylinder axis and the strip; and
    said linearly extending image sensor and the imaging beam path being rotatable synchronously around the cylinder axis of the support body in order to record successive line-shaped strips of the frustrated total reflection at the illuminated outer surface due to the skin parts contacting the support surface and to combine them to form a two-dimensional image of the skin part resting thereon.

2. The arrangement according to claim 1, wherein the support body is a cylinder sector.

3. The arrangement according to claim 2, wherein the support body is a half-cylinder.

4. The arrangement according to claim 1, wherein a tube which is supported so as to be rotatable around the cylinder axis is provided for synchronous rotation of the image sensor and elements of the imaging beam path, wherein the tube is arranged outside the conical recess of the support body.

5. The arrangement according to claim 1, wherein a tube which is supported so as to be rotatable around the cylinder axis is provided for synchronous rotation of the image sensor and elements of the imaging beam path, wherein the tube is arranged in a cylindrical recess of the support body, which cylindrical recess extends coaxial to the cylinder axis.

6. The arrangement according to claim 5, wherein the imaging beam path is folded into the tube and the cylindrical recess by means of a reflecting surface.

7. The arrangement according to claim 4, wherein a stepper motor is provided for the successive rotation of the tube around the cylinder axis to move the imaging beam path and the image sensor for successive scanning of strips of the support surface of the support body.

8. The arrangement according to claim 7, wherein the light source is a linear light source which is rigidly fastened to the tube, wherein the linear light source is movable parallel to the top of the conical recess at the first end face of the cylindrical support body and synchronous with the imaging beam path around the cylinder axis.

9. The arrangement according to claim 1, wherein the light source has a diffuser arranged downstream thereof in order to generate an intensive background illumination on the inner cylindrical surface of the support body at least along a surface line of the support surface.

10. The arrangement according to claim 9, wherein the light source is a plane projector that is arranged along the surface of the conical recess in order to generate an intensive background illumination on the inner surface of the support body on the entire support surface.

11. The arrangement according to claim 9, wherein the light source is a collimated linear light source which is arranged so as to be rotatable along the surface of the conical recess synchronous with the imaging beam path in order to generate a strip of intensive background illumination along the surface lines of the support surface on the inner surface of the support body.

12. The arrangement according to claim 1, wherein the imaging beam path has at least one imaging optics arrangement for imaging a strip of the cylindrical surface of the support body on the linearly extending image sensor.

13. The arrangement according to claim 12, wherein the imaging beam path contains at least one optical element for correcting the perspective distortion of the strip of the support surface imaged on the image sensor.

14. The arrangement according to claim 13, wherein the imaging beam path has at least one wedge-shaped prism for correcting the perspective distortion of the strip of the support surface imaged on the image sensor.

15. The arrangement according to claim 14, wherein the imaging beam path has two prisms for correcting the perspective distortion and a reflecting surface for folding the beam path.

16. The arrangement according to claim 15, wherein the reflecting surface is that of a separate plane mirror.

17. The arrangement according to claim 15, wherein the reflecting surface is arranged on one of the prisms as a reflecting back surface.

18. The arrangement according to claim 15, wherein the reflecting surface is a back surface of a totally reflecting prism of high-refractive index glass.

19. The arrangement according to claim 15, wherein the first prism is integrated in the cylindrical support body in that the angle ($\phi$) between the support surface and the conical recess as exit surface of the imaging beam path is appreciably larger than the angle of the total reflection and than the corresponding angle ($\gamma$) of the conical recess on the side of the illumination beam path.

20. The arrangement according to claim 13, wherein the imaging beam path has a curved mirror for partial correction of the perspective distortion and for folding the imaging beam path.

21. The arrangement according to claim 1, wherein heating elements are arranged over a large area on radially extending delimiting surfaces of the support body in the form of a cylinder sector preferably in order to prevent condensation and to promote excretion of perspiration to increase contrast.

22. The arrangement according to claim 1, wherein calibrating devices are arranged on the outer surface of the support body outside the support surface and are covered at least by hoods in order to calibrate and check the imaging beam path.

* * * * *